Nov. 11, 1952

J. I. KERN 2,617,870

INDICATING APPARATUS

Filed April 22, 1950

INVENTOR
JACK I. KERN

BY Carl Beust
Louis A. Kline
HIS ATTORNEYS

Nov. 11, 1952 J. I. KERN 2,617,870
INDICATING APPARATUS
Filed April 22, 1950 2 SHEETS—SHEET 2

INVENTOR
JACK I. KERN

BY Carl Benst
Louis A. Kline
HIS ATTORNEYS

Patented Nov. 11, 1952

2,617,870

UNITED STATES PATENT OFFICE 2,617,870

INDICATING APPARATUS

Jack I. Kern, Dayton, Ohio, assignor to The National Cash Register Company, Dayton, Ohio, a corporation of Maryland Application April 22, 1950, Serial No. 157,603

9 Claims. (Cl. 177—337)

This invention relates to an indicating mechanism and in particular to a novel means for positioning an indicating means to desired data-indicating positions.

The embodiment of the indicating mechanism which will be described to illustrate the invention is largely of mechanical construction with electrical controls whereby the potential of data-representing points can be sensed and utilized to cause the indicating means to display data corresponding to points which have a distinctive control potential applied thereto. In this embodiment, the indicating means will indicate amounts in the decimal notation and may take the form of a drum movable to place numerals in reading position and/or a type wheel to present numerals in printing position. While the decimal notation is to be used in explaining the invention, it will be obvious that the indicating means can be arranged to indicate other data, if desired.

In general, the indicating mechanism is made up of a plurality of units according to the denominational capacity desired. Each one of the units is of extremely simple construction and is so constructed as to be readily removed for servicing or to be replaced. Included in each unit are an indicating means which can be set to different positions to indicate the desired numeral, a positioning control operable in conjunction with the operation of the indicating means for sensing potentials of data-representing points and causing the indicating means to be positioned according to the numeral to be indicated, and a positive driving means controlled by the positioning control and operable to drive the indicating means to the required position.

The positioning control for each indicating means includes a wiper or sensing means which is rotated with the indicating means to successively engage segments of a stationary commutator device, and a drive control circuit connected to the wiper for controlling the effectiveness of the driving means to drive the indicating means. The commutator is provided with a segment for each of the numerals which may be indicated, to which segments the digit-representing potentials are applied, that segment which corresponds to the numeral to be indicated having a potential applied thereto which is distinctive from that which is applied to the other commutator segments. Whenever the wiper engages a commutator segment which does not have the distinctive potential, the drive control circuit will be rendered operable to render the driving means effective to drive the indicating means to the next numeral position and the wiper to the next segment. In any cycle of operation in which the wiper engages the segment having the distinctive potential applied thereto, the drive control circuit will be operable to interrupt the drive to the unit and cause the indicating means to be arrested in the corresponding position.

The driving means for each unit includes a cyclically-operable clutch for connecting the indicating means and the sensing means of that unit to a drive shaft which is common to the plurality of units. The clutch has its output geared to the indicating means and the sensing means by such a ratio that the indicting means will be driven from one numeral-indicating position to the next and the sensing means will be driven from one commutator segment to the next for each cycle of operation of the clutch. An electromagnet in the drive control circuit controls the cycling of the clutch and will allow the clutch to be effective to drive the indicating means until the indicating means has been positioned in the desired position. This driving means has the advantage that it can drive the indicating means positively and rapidly to any desired position and can provide a large driving force if such is needed in moving the indicating means to the desired position.

The novel indicating mechanism, which utilizes a separate clutch to position the indicating means for each unit, has the advantage that each indicating means can be set individually, and a change in the setting of the indicating means for one unit does not affect the setting of the indicating means of the other units.

The novel indicating means has the further advantage that the positioning control circuit can have considerable latitude in the time of its control, since it need only initiate a cycle of operation of the clutch and can be controlled by the next segment early in that cycle to control whether or not a further cycling of the clutch will be made according to the requirement of the potential applied to that next segment.

It is an object of the invention to provide a small compact indicating mechanism of unit construction, each unit containing an indicating means which can be set individually and without requiring the operation of the indicating means in the other units.

A further object of the invention is to provide an indicating mechanism in which each indicating means is provided with a driving means which can provide a large driving force, if desired, to position the indicating means positively and rapidly to desired indicating positions.

A further object of the invention is to provide an indicating mechanism which has a separate cyclically-operable clutch for each indicating means and in which each cycle of operation of the clutch is operable to index the indicating means from one character-indicating position to another.

A further object of the invention is to provide a novel positioning control circuit for sensing potentials of data-representing points for the one corresponding to data to be indicated and to which a distinctive potential will be applied and for controlling the cycling of a clutch to position an indicating means to indicate this datum.

With these and incidental objects in view, the invention includes certain novel features of construction and combinations of parts, a preferred form or embodiment of which is hereinafter described with reference to the drawings which accompany and form a part of this specification.

Since each of the units which are combined to form the indicating mechanism is the same, the construction and operation of the mechanism will be clear from a description of one of the units.

Figure 1:
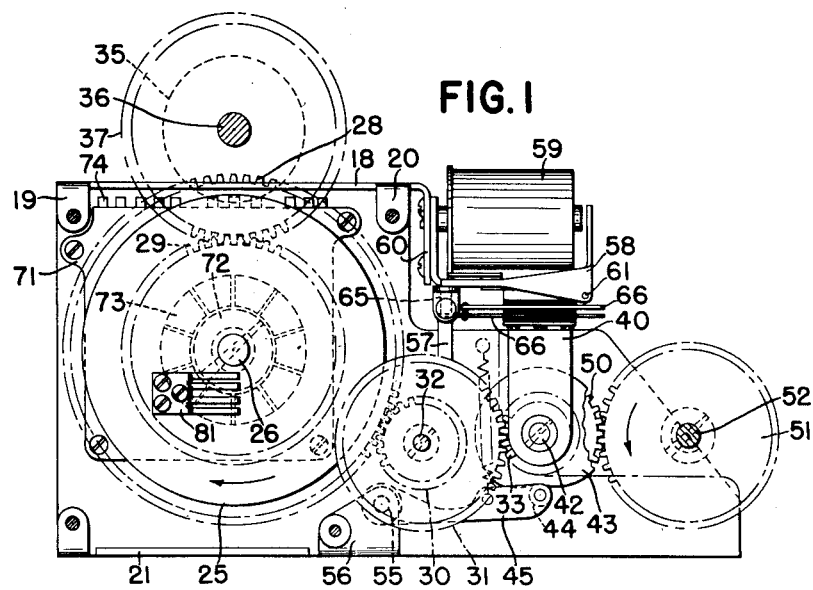
Fig. 1 is an elevation view of a unit of the indicating mechanism with one of the side plates removed but shown in dot-and-dash lines.

The various components of a unit are mounted between side plates 15 and 16 and on plate 17, which is secured to the side plate 15. The side plates 15 and 16 are held in proper spaced relation at the top, as shown in Fig. 1, by a bent-over portion 18 of plate 15, which has ears 19 and 20, to which plate 16 is secured, and are held in proper spaced relation at the bottom by a spacer plate 21, which has ears to which both side plates may be secured.

The indicating means, in the form of a drum 25, has a plurality of characters, in this case the numerals "0" and "1" to "9", about its periphery and is secured to a shaft 26, one end of which is rotatably journaled in the side plate 16 and the other end of which is secured to a flanged disc 27, rotatable in the side plate 15 and secured to gears 28 and 29. The flange on disc 27 engages one side of plate 15, and the gear 28 engages the other side of plate 15 to enable the shaft to be retained in position on plate 15.

Gear 28 is connected through gears 30 and 31 secured to a shaft 32, rotatable in the side plates 15 and 16, to an output gear 33 of a cyclically-operable clutch. In the disclosed embodiment, the cyclically-operable clutch is a single-revolution clutch, and the gear ratio between the gears 28, 30, 31, and 33 is such that, for each revolution of the clutch, the drum 25 will be indexed from one numeral-indicating position to the next. Since there are ten numerals about the drum, the drum will be geared to the clutch with a one-to-ten ratio. If either the number of indicating positions on the drum or the cycle of operation of the clutch, or both, is changed, the gear ratio may be adjusted to provide one increment of movement to the drum for each cycle of operation of the clutch.

If desired, the numerals may be left off of the drum 25 and the drum not used as the indicating means, but, instead, the indicating means may be outside the unit, as shown by a type wheel 35, which is mounted on a shaft 36, geared through gear 37 to gear 29 to be driven in the manner explained above in connection with the positioning of drum 25.

The clutch may be any form of cyclically-operable clutch; the one shown to illustrate the invention, which is similar to one shown in the co-pending application of Jack I. Kern, Serial No. 139,817, which was filed January 21, 1950, and issued as Patent No. 2,603,702 on July 15, 1952, is merely representative of a one-revolution clutch and is not to be considered as the only clutch which might be used. As shown in Figs. 1 to 4, the clutch is mounted in a bracket 40, which is secured to the plate 17. The output gear 33 is secured to a housing 41 of the clutch by a shaft 42 rotatable in the bracket 40. The housing 41 is formed with a cam 43 thereon, which cooperates with a roller 44 on the end of a spring-urged lever 45 to determine the home or end-of-cycle position of the clutch and contains a spring-urged pawl 46, which is normally urged into engagement with a ratchet 47. A control lever 48 in the housing can be engaged by a trip lever 49 in the home position of the clutch to hold the pawl 46 from engagement with the ratchet 47 to uncouple the drive. The ratchet 47 has a gear 50 secured thereto and is rotatably supported on a stud carried by the bracket 40.

The ratchet 47 is driven by the gear 50, which meshes with a gear 51 secured on a drive shaft 52, which is driven by a motor or other suitable driving means during the operation of the indicating mechanism. This drive to the unit is such that the unit can be readily disconnected from the drive shaft of the indicating mechanism and the unit removed therefrom merely by shifting the unit to the left (Figs. 1 and 2) to move gear 50 out of mesh with gear 51.

When the trip lever 49 is moved from blocking relation with control lever 48, the pawl 46 will be freed to engage the ratchet 47 and couple the housing 41 and the output gear 33 to the ratchet 47 and the drive shaft 52 for a cycle of operation. At the end of the cycle, the control lever 48 can engage the trip lever 49 to move the pawl 46 from engagement with the ratchet 47 and uncouple the drive to the unit.

The trip lever 49 is pivotally mounted on a stud 55, carried between an upstanding ear 56 on the spacer plate 21 and the side plate 15, and is coupled by a link 57 to an armature 58 of a clutch control magnet 59, mounted on a bracket 60 extending from the top spacer portion 18. Whenever the magnet 59 is energized, its armature 58 will be rocked counter-clockwise (Figs. 1 and 3) about its pivot 61 to force the end of the trip lever 49 downwardly and out of blocking engagement with the end of the control lever 48 to free the clutch for a cycle of operation.

As the armature 58 is rocked counter-clockwise, it will engage an insulating stud 65 on a spring blade of contact 66 to open the contact 66 and place the spring under tension. This tension will return the armature 58 to unoperated position and restore the trip lever 49 into blocking position when the magnet 59 is deenergized.

Figure 2:
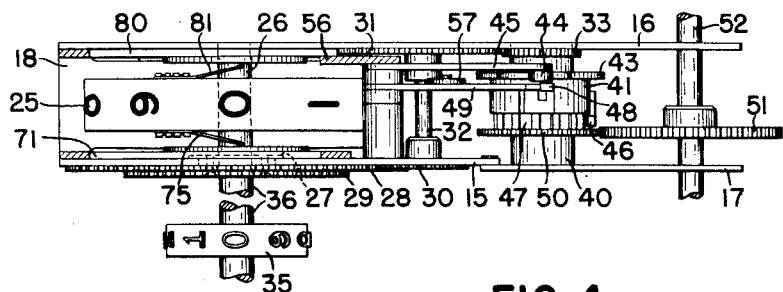
Fig. 2 is a bottom view of a unit of the indicating mechanism with a portion of the bottom plate removed to show the mechanism more clearly.
Figure 3:
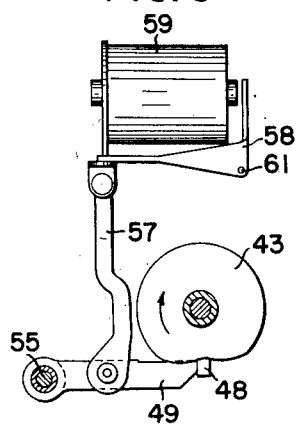
Fig. 3 shows the clutch control magnet and the linkage through which the clutch control is effected.
Figure 4:
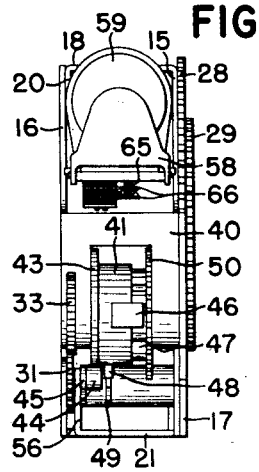
Fig. 4 is an end view of the unit, looking to the right in Fig. 1, with certain parts omitted for clarity.
Figure 5:
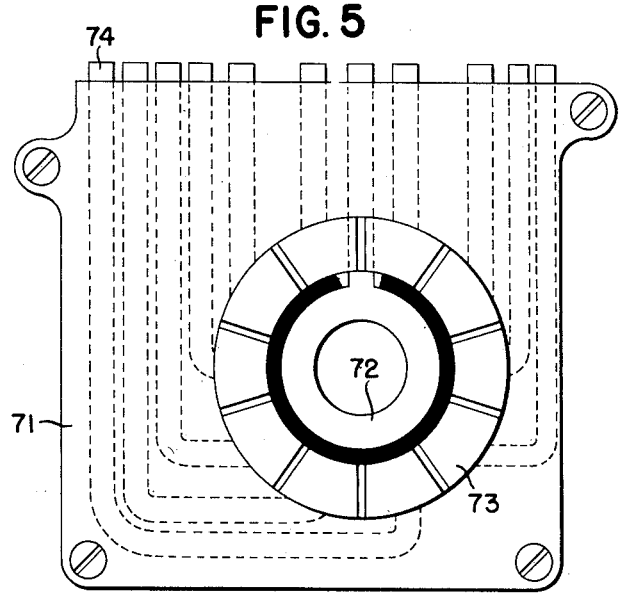
Fig. 5 is a detail view of one of the commutators used in controlling the setting and read-out from the indicating apparatus.

As shown in Figs. 1 and 2, the stud 55, which carries the trip lever 49, also serves as the pivot for the spring-urged lever 45.

The manner in which the positioning controls can control the energization of magnet 59 and the cycling of the clutch to drive the indicating means to the proper position will now be explained.

The control of the indicating mechanism according to the characters to be displayed is provided by control signals applied to the mechanism. In the disclosed embodiment, the control will be effective to cause the desired numeral to be indicated and the control signal which will be used will be in the form of a distinctive potential derived from any suitable numeral- or digit-representing potential supply. One such supply is shown diagrammatically at 70 in Fig. 6 and may be, for example, a denomination of an electronic accumulator, such as that disclosed in the co-pending application of Carl F. Rench, Serial No. 133,540, which was filed on December 17, 1949 and issued as Patent No. 2,591,007 on April 7, 1952, having a read-out network providing ten output potential points, the potentials of which vary with digits registered in the accumulator, the point corresponding to the registered digit being more negative than the others. The ten output potential points from the potential supply are connected to ten segments of a commutator 71 (Figs. 1, 2, 5, and 6). As shown most clearly in Fig. 5, the commutator has a central ring 72 and a segment, as 73, for each of the numerals or digits to be indicated, the ring and the segments, together with necessary leads, as 74, being molded in a suitable support of insulating material. The commutator 71 is secured on the inside of the side wall 15 (Figs. 1 and 2) in such a position that the shaft 26 extends through a central opening in the commutator. A sensing means, which is in the form of a bridging wiper 75 and which is mounted on the side of the drum 25, connects the segments, as 73, to the ring 72 one after another as the drum is rotated, thereby enabling the potential of the various potential points to be sensed in succession. The position of the wiper 75 on the drum 25 relative to the numerals thereon is such that, as the drum moves the numerals to reading position, the wiper will engage the segments which correspond to those numerals. Suitable openings in the side plates enable connections to be made to the commutator leads, as 74.

Figure 6:
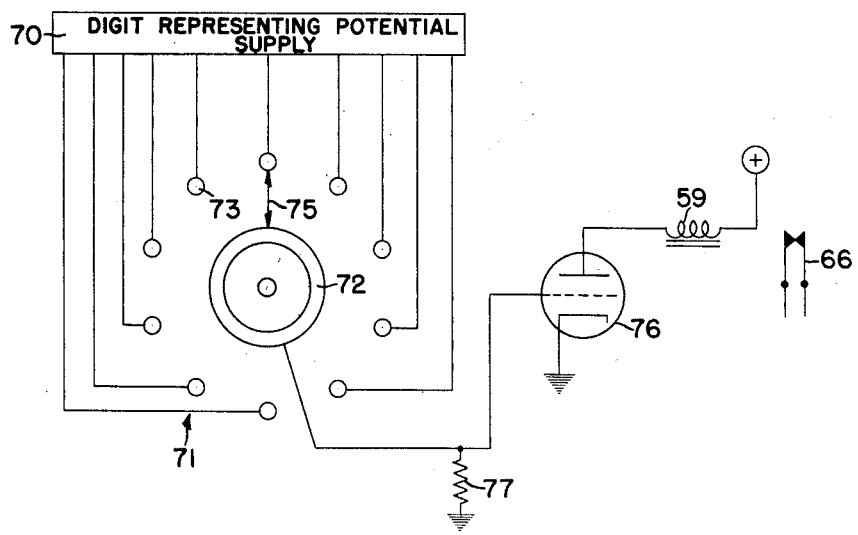
Fig. 6 is a wiring diagram and schematic showing of certain controls for the indicating apparatus.

A typical driving control circuit for one of the units is shown in Fig. 6. The ring 72 of the commutator is connected to the grid of a normally conducting vacuum tube 76. This tube has its cathode grounded, its grid connected to ground over a resistor 77 and to potentials supplied from the wiper, and its anode connected through the clutch control magnet 59 to a source of suitable positive potential. As the wiper 75 couples the various segments, as 73, to the ring 72, their potentials will be applied to the grid of tube 76. Tube 76, being normally conducting, will conduct and maintain the magnet 59 energized to cause the clutch to operate through cycles until the wiper 75 applies the negative control potential to the grid. This will drive the grid to cut-off, causing conduction to cease in tube 76 and the magnet 59 to be deenergized, which will then allow the trip lever 49 to return to blocking position to interrupt further cycling of the clutch. The indicating means will remain in this position as long as the negative control potential is applied to the segment on which the wiper has stopped. As soon as the digit-representing potentials are changed to apply the negative control potential to another segment, tube 76 will conduct immediately and cause magnet 59 to be energized to initiate further cyclic operation of the clutch. The clutch will continue to cycle until the wiper engages the new segment to which the negative control potential has been applied.

It is to be understood that the control of the clutch control circuit is not limited to the use of negative potentials and that, by using suitable inverters between the wiper and the control tube, the control can be made according to a positive potential as the distinctive potential.

Since the contact 66 is opened whenever the clutch control magnet 59 is energized, these contacts in the various units can be incorporated in a signal circuit to provide an indication when any of the indicating means is being set.

It is to be noted that each unit of the indicating mechanism can be set independently of the other units, so that, when a change is required in one unit, only that unit and not all the units will be operated.

The novel indicating mechanism has the advantage that the time required to change from the indication of one numeral to another is not fixed by the maximum time that may be needed for the longest change in setting, but is limited only by the time necessary to go from the old setting to the new. That is, the time required for a change in setting from "1" to "2" would be that required for one revolution of the clutch, the time required for a change from "1" to "3" would be that required for two revolutions of the clutch, etc., and in no case would the time be greater than that actually required for the necessary number of increments of movement of the drum.

The novel positioning control has the further advantage that the driving circuit which is controlled by the position of the wiper 75 is required only to initiate the cycle of operation to move the wiper to the next segment. This means that, early in this cycle of operation, the wiper can engage the next segment, and the control of the circuit according to the potential of the next segment can be effective during a large portion of the cycle and insure that the magnet will be in proper energized or deenergized condition prior to the end of the cycle to prevent a further cycling of the clutch or to allow a further cycle to take place as required by the potential applied to the next segment. This provides considerable latitude in the time the control according to the next segment can be effective and enables higher-speed operation to be obtained.

Each unit is also provided with a read-out means to enable the setting of the indicating means to be ascertained or used for a further control. This read-out means consists of a commutator 80 (Fig. 2), which is of the same construction and arrangement as commutator 71, and a wiper 81 (Figs. 1 and 2), which is similar to wiper 75 and is also mounted on the drum 25 to be positioned therewith. The operation of the read-out is just the reverse of that of the control commutator in that each of the segments of the commutator is connected to an output conductor, and a potential applied to the ring of the commutator will be switched by the wiper 81 to that segment and output conductor which corresponds to the numeral being indicated by the indicating means. The potential which is thus supplied selectively to one of the output conductors can be used to control some other apparatus, as desired.

The novel indicating mechanism, therefore, enables the indication of data to be made very rapidly and with a very powerful driving force applied to the setting of the indicating means, and, being of unit construction, is very flexible in the amount of data which it can accommodate. The unit construction enables each unit to be operated independently of the others and also enables any unit to be readily removed from the mechanism for replacement or repair.

While the device shown and described herein is admirably adapted to fulfill the objects primarily stated, it is to be understood that it is not intended to confine the invention to the one form or embodiment herein disclosed, for it is susceptible of embodiment in various other forms.

What is claimed is:

1. In an indicating mechanism, the combination of an indicating means having characters thereon and movable to place the several characters in indicating position in succession; driving means; means connecting the indicating means to the driving means for operation thereby, said connecting means including a cyclically-operable positive-drive clutch normally disconnecting the indicating means from the driving means but operable to connect the indicating means to the driving means for positive drive thereby in each cyclic operation of the clutch and including gearing connecting the clutch to the indicating means in a ratio that one cycle of operation of the clutch will move the indicating means from the position in which one character is in indicating position to the position in which the next character in the succession is in indicating position; means to supply data-representing potentials to the indicating mechanism, the potential representing the data to be indicated being of a value which is distinctive from the remaining potentials which are supplied; electromagnetic means to initiate a cycle of operation of the clutch; and potential-sensitive means controlled jointly by the data-representing potentials and by the position of the indicating means for controlling energization of the electromagnet to govern the cycling of the clutch to move the indicating means from a previously set position to a new position with the character in indicating position according to the distinctive data-representing potential supplied to the indicating mechanism; said clutch making one cycle of operation for each character which is traversed in going from the previously set position to the position corresponding to the new data-representing potential.

2. In an indicating mechanism, the combination of means to represent data by potentials applied to potential points corresponding to all possible characters which may be made apparent, the point corresponding to the particular character to be brought to indicating position having a potential value distinctive from the rest; indicating means having characters thereon and operable to present the characters in succession to indicating position; means operable to sense the potential points one after another in succession for the one having the distinctive potential; driving means; means connecting the indicating means and the sensing means to the driving means for cyclic operation thereby, said connecting means including a cyclically-operable clutch and connections between the clutch and the indicating means and the sensing means, said clutch normally disconnecting the indicating means and the sensing means from the driving means and, when tripped, connecting these means to the driving means for a cycle of operation of the clutch, and said connections causing the indicating means to be positioned to indicate the character corresponding to that of the point being sensed by the sensing means, and said driving means being effective in each cycle of operation of the clutch to drive the sensing means from one potential point to the next and to move the indicating means to place the next character thereon in indicating position; an electromagnetically-operated means to trip the clutch for a cycle of operation each time the sensing means senses a point which does not have the distinctive value of potential applied thereto and to arrest the clutch to disconnect the drive and prevent further cycling when the sensing means senses a potential point to which the distinctive value of potential is applied; and a drive control circuit including a potential-sensitive means controlled by the sensing means for controlling the energization of the electromagnet in the electromagnetically-operated means according to the various potentials which are sensed.

3. An indicating mechanism as claimed in claim 2 in which the potential-sensitive means in the drive control circuit includes an electronic device having a conduction control means connected to the sensing means and having the electromagnet in its anode-cathode circuit, the sensing means as it senses the various potentials applied to the various potential points controlling the conductivity of the electronic device according to the potential which is sensed and thereby enabling the distinctive potential to control the energization of the magnet.

4. In an indicating mechanism made up of a plurality of readily insertable and removable indicating units and a common drive means therefor, in combination in each unit, an indicating means settable to a plurality of positions and in each position indicating a particular character; a positive-drive cyclically-operable clutch for selectively connecting the indicating means to the common drive means and controlling the drive for the unit and including a gear moved into mesh with a gear on the common drive means as the unit is inserted in the mechanism; gearing connecting the clutch to the indicating means in such a ratio that one cycle of operation of the clutch will move the indicating means of the unit from one indicating position to the next adjacent position; means to supply controlling potentials to each unit to control the character to be indicated by that unit; and means controlled jointly by the potentials applied to the unit and by the position of the indicating means of the unit for controlling the cycling of the clutch of the unit to connect the indicating means for the unit to the common drive means for operation thereby to move the indicating means from the previously set position to a new position in which it indicates the character corresponding to the particular control signal applied to the mechanism, the individually-controlled clutch for the unit enabling a change in the indication in one indicating unit to be made without affecting the indication in any other indicating unit.

5. In a device of the class described, the combination of a settable means movable to a plurality of positions and in each position representing a particular character; driving means; means connecting the settable means to the driving means to drive the settable means from any set position to any other desired one of said positions, said connecting means including a cyclically operable clutch and gearing driven thereby, said clutch being effective when a cycle of operation thereof is initiated, to connect said gearing to said driving means to enable the settable means to be given a cycle of operation thereby, and said gearing having a ratio to cause said settable means to move from one set position to the next adjacent position for each cycle of operation of the clutch; a plurality of contacts corresponding to the characters; means to supply control signals to the device in the form of potentials supplied to the contacts, the potential corresponding to the character to be represented being of a value which is distinctive from the potentials applied to the rest of the contacts, to control to which position the settable member will be set; and potential-sensitive means for sensing said contacts and controlled jointly by the value of the potential and by the position of the settable means for controlling the cycling of the clutch to connect the settable means to the driving means to drive the settable means from the previously set position to a new position in which it represents the character corresponding to the one for which the distinctive potential was applied to the contacts.

6. In a device of the class described, the combination of a rotatable indicating means settable to a plurality of positions and in each position indicating a particular character; a driving means; means connecting the indicating means to the driving means to enable the driving means to rotate the indicating means from any set position to any other desired one of said positions, said connecting means including a single-revolution positive-drive clutch and gearing connecting the clutch to the indicating means, said clutch, when tripped, connecting the gearing to the driving means in a positive-drive relation for one revolution of the clutch and said gearing having a ratio to cause the indicating means to move from any set position to the next adjacent position for each single revolution of the clutch; a plurality of conductors, one for each character; means to supply control signals to the conductors in the form of different potentials, with the potential corresponding to the character to be indicated being of a value distinctive from the rest to control which character will be indicated; sensing means operable in synchronism with the indicating means for sensing the conductors; and potential-sensitive means connected to the sensing means to be controlled thereby jointly according to the value of the potential and by the position of the indicating means for controlling the cycling of the clutch to connect the indicating means to the driving means to drive the indicating means from any previously set position to a new position in which it indicates the character corresponding to the distinctive potential of the control signal applied to the device; said clutch making one revolution for each of the positions through which the indicating means moves during the traverse of the indicating means from the previously set position to the new position.

7. In a device of the class described, the combination of a plurality of commutator segments equal in number to various characters which may be indicated; means to apply potentials to the several segments according to the characters to be indicated, the segment corresponding to the particular character to be indicated having a value of potential applied thereto which is distinctive from the value of potential applied to the remaining segments; means movable to engage the segments one after another in succession to sense the potentials applied thereto; driving means; a cyclically-operable clutch, effective, when tripped, to connect the sensing means to the driving means for a cycle of operation thereby and in each cycle of operation moving the sensing means from one segment to the next segment in the sequence; a clutch control circuit connected to the sensing means and controlled thereby, said circuit including potential-sensitive means and an electromagnet operated thereby to trip the clutch to connect the sensing means to the driving means for a cycle of operation of the clutch to move the sensing means to the next segment if the segment being sensed does not have the distinctive potential applied thereto, said electromagnet being unoperated and causing the clutch to disconnect the sensing means from the driving means to prevent further cycling when the sensing means engages the segment to which said distinctive potential has been applied; and a settable member connected to the sensing means to be operated therewith and settable to positions to indicate said characters, the position to which the member is set at the end of any cycle of operation representing the character corresponding to that represented by the segment with which the sensing means is engaged.

8. The indicating device as claimed in claim 7 in which the sensing means is so located relative to the segments that it will move from a segment early in the cycle of operation of the clutch and engage the next segment in order that the control according to the next segment can become effective before the end of the cycle of operation of the clutch.

9. In an indicating mechanism made up of a plurality of readily insertable and removable indicating units and a common drive therefor, the combination of, in each unit, an indicating means settable to a plurality of positions and in each position indicating a particular value; a plurality of conductors, corresponding to the various values which may be indicated and to which controlling potentials may be applied, the conductor corresponding to the value to be indicated having a potential applied thereto which is distinctive from the rest; sensing means operable in synchronism with the indicating means to sense the controlling potentials applied to the conductors; a positive-drive cyclically-operable clutch for connecting the unit to the common drive means for operation thereby, said clutch including an input gear moved into mesh with a gear on the common drive means as the unit is inserted in the mechanism, an output gear, and means to positively couple the input gear to the output gear for a cycle of operation of the clutch whenever a cycle of operation of the clutch is initiated; gearing connecting the output gear of the clutch to the indicating means and the sensing means with a ratio to enable a cycle of operation of the clutch to move the indicating means from a value-indicating position to the next adjacent value-indicating position and to move the sensing means to the next conductor to sense for a controlling potential related to the next value; and means connected to the sensing means and controlled thereby jointly according to the potentials applied to the unit and to the position of the indicating means and the sensing means for initiating the cycling of the clutch to connect the unit to the common drive means for operation thereby to move the indicating means from the previously set value-indicating position to a new position in which it indicates the value corresponding to the particular control potential applied to the unit; the individually-controlled clutch for connecting the unit to the common drive enabling a change in indication in one unit to be made without affecting the setting in any other indicating unit.

JACK I. KERN.

REFERENCES CITED

The following references are of record in the file of this patent:

UNITED STATES PATENTS

| Number | Name | Date |
|--------|------|------|
| 518,037 | Hunter | Apr. 10, 1894 |
| 2,074,066 | Wheeler et al. | Mar. 16, 1937 |